A. W. HALL.
Phonograph.
No. 219,939.    Patented Sept. 23, 1879.
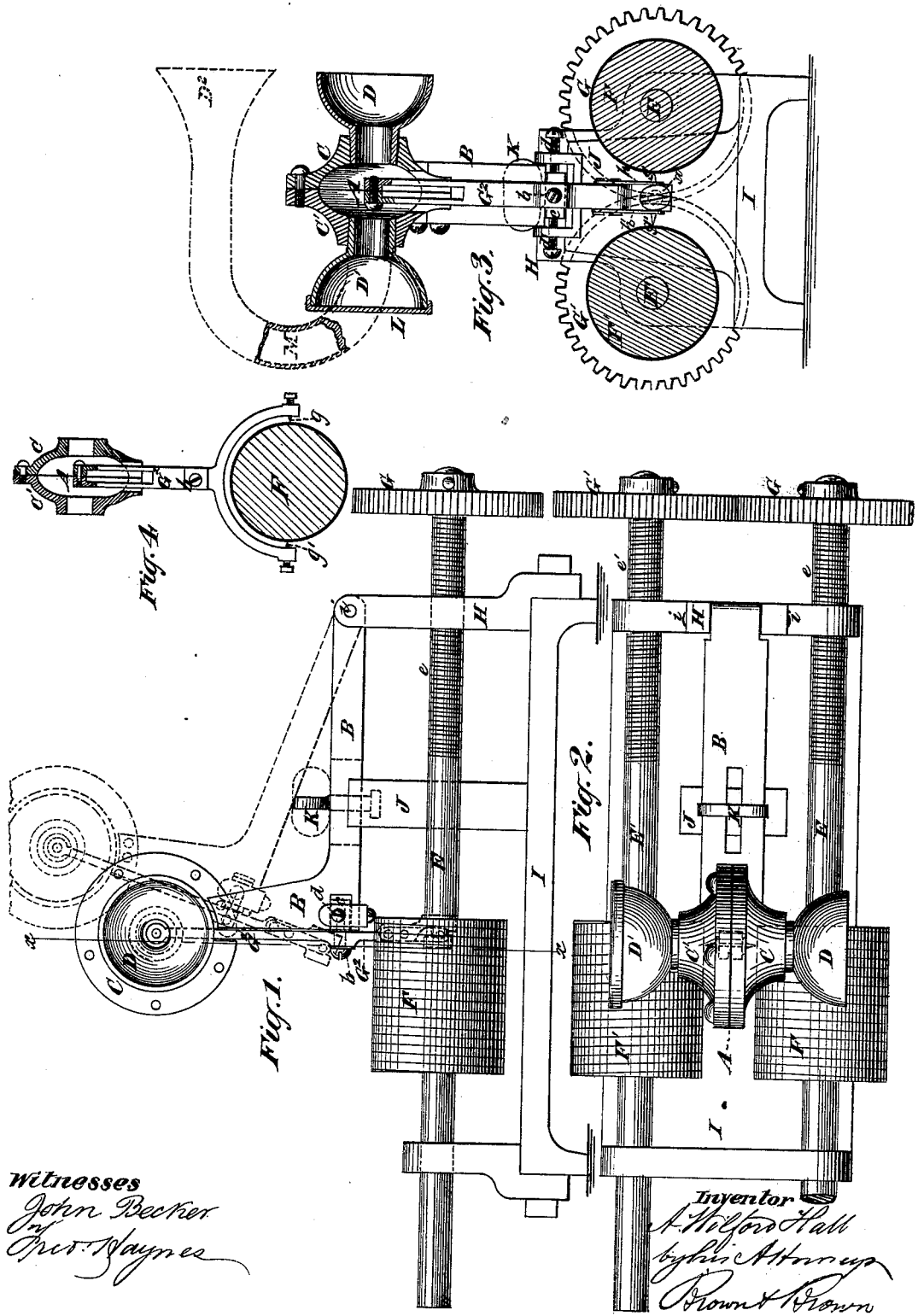

UNITED STATES PATENT OFFICE.

A. WILFORD HALL, OF NEW YORK, N. Y.

IMPROVEMENT IN PHONOGRAPHS.

Specification forming part of Letters Patent No. 219,939, dated September 23, 1879; application filed November 29, 1878.

*To all whom it may concern:*

Be it known that I, A. WILFORD HALL, of the city, county, and State of New York, have invented certain new and useful Improvements in Phonographs; and I do hereby declare that the following is a full, clear, and exact description of the same, reference being had to the accompanying drawings, forming part of this specification.

This invention consists in certain improvements in the phonograph which is the subject of Letters Patent No. 200,521, dated February 19, 1878, to Thomas A. Edison. In that instrument, as described by the patentee in the specification of his said Letters Patent, the sound-recording indentations or impressions produced on the tin-foil or yielding material are obtained by a single point and from one side only of the vibrating diaphragm, which is actuated by the sounds to be reproduced, and a single record only of the sounds is made, the indentations in such record being produced by the vibrations of the diaphragm in one direction only. Moreover, the vibration of the diaphragm is more or less restricted in consequence of the method of adjustment described in said Letters Patent, such adjustment having the effect of bringing a lateral tension on the diaphragm in one direction when the instrument is in its normal condition or at rest.

The objects of my invention are to provide for a more free vibration of the diaphragm, and to more fully utilize the vibrations of the diaphragm in both directions, both in the recording and in the reproduction of sounds, whereby I believe that several important advantages may be obtained, as will be hereinafter explained.

My invention consists, principally, in the combination, with the sound-recording or sound-reproducing diaphragm, of two points and one or more moving surfaces of yielding material, suitably arranged in connection with said points, whereby a divided record of the vibrations of the diaphragm is obtained and a double action is produced on the diaphragm for the reproduction of the sound—that is to to say, in obtaining the record, one half is obtained from one point and from one side of the diaphragm by the vibrations of the diaphragm in one direction, and the other half is obtained from the other point and from the other side of the diaphragm by the vibrations of the diaphragm in the opposite direction; and in the reproduction of the sound the vibrations of the diaphragm in one direction are produced from one half of the record, and those in the other direction from the other half of the record. By this means less depth of penetration of the points is required than when the record is made by a single point, and, as it is not necessary to put the diaphragm under a normal lateral tension in one direction, the diaphragm will vibrate in response to less atmospheric disturbance than when a single point and recording-surface are employed.

My invention further consists in the combination, with the diaphragm of a phonograph, of two mouth-pieces, one on each side thereof, whereby several important advantages are obtained, as will be hereinafter fully explained.

My invention also consists in several improvements of the details of construction of the instrument, as will be hereinafter fully specified.

Figure 1 in the accompanying drawing is a side view of a phonograph with my improvements. Fig. 2 is a plan of the same. Fig. 3 is a vertical section of the same in the plane indicated by the line $x\ x$ of Fig. 1.

A is the diaphragm, which may be in any way suitably supported, but is represented as clamped between two internally-concave disks, C C', which are supported by a standard, B, and which are represented as fitted with separate tubes and mouth-pieces D D', one on each side of the diaphragm. A cap, L, is provided to fit and close either mouth-piece. It is shown in Fig. 3, placed on the mouth-piece D'.

E E' are two shafts arranged in suitable bearings below and parallel with the diaphragm, and carrying the two cylinders F F', upon which are to be secured the tin-foil or other yielding material upon which the record of the diaphragm is to be obtained. The said shafts have provided upon them screw-threads $e\ e'$, and one of the fixed bearings provided for each is provided with a corresponding female screw-thread, so that as the said shafts rotate they also have a longitudinal movement imparted to them by the act of rotation.

The said shafts are represented as geared together by gearing G G¹, to rotate at similar speeds but in opposite directions, and in order that both shafts and cylinders may have corresponding longitudinal movements, one has a right-hand and the other a left-hand screw-thread.

The cylinders F F' have each a helical groove provided in it of a pitch corresponding with the screw-threads on its respective shaft.

Between the diaphragm A and the cylinders F F' there is attached to the standard B a lever, G², the upper part of which is forked in such manner and shape, as shown in Fig. 3, as to pass through openings provided in the disks C C', and embrace the diaphragm between the two limbs of its fork, which are so shaped as to clamp or bear upon opposite sides of the diaphragm near its center only, leaving the rest of the diaphragm free to vibrate under the influence of the sound-waves.

The lower part of the said lever is furnished with two points, $g$ $g'$, which are so situated between or relatively to the two cylinders F F' that one is capable of touching the tin-foil or other yielding material on one cylinder, while the other is capable of touching that on the other cylinder.

The said points are attached to the lever by means of elastic carriers $h$ $h'$, or otherwise, in such manner as to be capable of adjustment to the requisite distance apart by means of a cam or eccentric, $a$, (see Fig. 3,) or other equivalent device attached to the lever for the purpose.

The fulcrum $b$ of the lever is made adjustable in the standard B by being secured in a sliding block, $c$, which can be moved upon the standard in one direction or the other by means of adjusting-screws $d$, $d'$ for the purpose of setting the lever, so that when the diaphragm and lever are at rest, and the points $g$ $g'$ are at the proper distance apart, the said points may both just touch or press equally upon the yielding material on the two cylinders.

In order to provide for the removal of the lever and points from between the cylinders when it is desired to move the cylinders without producing any marks upon the yielding surfaces thereon, or when it is requisite to place, remove, or replace the tin-foil or other yielding material upon the cylinders, the standard B, upon which the diaphragm and lever are mounted, is pivoted at $i$ to a stand, H, erected upon the supporting-base I of the instrument, so that the said standard, with the diaphragm and lever, can all be raised, as shown in dotted outlines in Fig. 1.

When the diaphragm and lever are in the operative position shown in Fig. 3, and in full outline in Fig. 1, the standard B rests upon a post, J, where it is then held down firmly by a button or set-screw, K.

The operation of the instrument in recording is as follows: The tin-foil or other yielding material upon which the record is to be obtained having been secured upon the cylinders, and the standard having been brought down and secured upon the post J to bring the points $g$ $g'$ between the two cylinders, and the cylinders having been so adjusted lengthwise, or the points so adjusted lengthwise, of the cylinders that one of the points is opposite to a groove in one cylinder and the other opposite to a groove in the other cylinder, the points are then adjusted so that each presses very slightly upon the foil or other material on one of the cylinders, and the shafts E E' and cylinders F F' are then set in motion by the clock-work or other motor provided for the purpose.

Either mouth-piece may be used; but the other one should be covered by the cap L, to prevent the neutralizing effect of air-waves passing around and acting upon the opposite side of the diaphragm to that which faces the open mouth-piece. Words spoken into the open mouth-piece then cause the diaphragm to vibrate, and the movements will be transmitted through the lever to the pins, and the vibrations will thereby be recorded by indentations in the foil or yielding material, one half of the record being obtained upon the material on one cylinder and the other half by indentations in the material on the other cylinder, each half of the record thus produced being the exact counterpart of the other half—that is to say, the indentations produced on the material on one cylinder being opposite the ridges left between the indentations of the material on the other.

The sound may be reproduced from either side of the diaphragm; but both sides may be utilized, and in order to provide for utilizing both sides the mouth-piece D or D¹ may be removed, and have a bent tube, M, and mouth-piece D² substituted for it, as shown in dotted outline in Fig. 3, so that the sound-waves produced on both sides of the diaphragm may be conducted in one direction.

In the operation of reproducing the sound, the vibration or movement of the diaphragm in one direction is produced by the half-record on one cylinder, and the vibration or movement in the other direction by the half-record on the other cylinder, the movements in both directions being produced in a positive manner with a velocity exactly proportioned to the velocity of the movements of the cylinders.

It is not absolutely necessary to employ two cylinders to produce the double or divided record. I have shown in the diagram Fig. 4 a construction of the lever and points whereby a single cylinder may be used, the lower end of the lever, to which the points $g$ $g'$ are attached, being forked to so straddle or embrace the said cylinder that one point may act against or be acted upon by one side of the cylinder and the other point act against or be acted upon by the other side of the cylinder. In such case the cylinder should contain two helical grooves, the turns of each intervening between those of the other, and one of the points being arranged to press or touch the foil or other surface which is to receive the record opposite one of the said grooves, and the other to press or touch it opposite the other of said grooves, so that the double or divided record may be produced on the one surface, but in distinct lines of indentations.

I have hereinbefore briefly alluded to some of the advantages resulting from this duplex system of recording and reproducing the vibrations of the diaphragm, but will now explain others of these advantages.

With a single point and a record produced from one side of the diaphragm only, the diaphragm in the reproduction of the sound can only be moved in one direction by the motion of the indented surface, swinging back in the other direction by its own normal vibration, and with a velocity only equal to its own vibrational number, which of course depends on its size, weight, and rigidity. Hence if the rotation of the cylinder should vary in speed from this normal vibrational rate, as it necessarily must do in producing tones of various degrees of pitch, it follows that a constant irregularity must occur between the rates of diaphragmatic vibrations in the two opposite directions, and this is what I believe to be the cause of the nasal intonation noticed in the single-acting instrument; but I believe that with the duplex system this defect will be remedied, as the two opposite indented surfaces driving the diaphragm positively with equal velocity in either direction in perfect alternation should reproduce the spoken words with the same intonation which formed the record.

The employment of the lever between the diaphragm and the recording-surfaces, besides obtaining the advantages hereinbefore mentioned, enables the diaphragm to be brought to a position above or out of the way of the recording part of the apparatus, and so enables both of its sides to be made available, as hereinbefore described, for reproducing the spoken words or sounds, thereby making the reproduction much louder than when the sonorous effect is produced from one side of the diaphragm only, as is unavoidable when the recording-point is arranged directly opposite to the diaphragm. Moreover, it is by placing the diaphragm in this position, out of the way of the recording apparatus, and permitting the tube or mouth-piece on one side of the diaphragm to be closed, that I prevent the neutralizing, hereinbefore mentioned, of sound-waves acting on the opposite side of the diaphragm to that against which a speaker's voice is directed.

By providing for the use of two mouth-pieces, one on each side of the diaphragm, and connecting them by tubes of suitable length with the diaphragm, two persons seated on opposite sides of the instrument may carry on a rapid and uninterrupted conversation.

Although the greatest advantages resulting from the use of a lever between the diaphragm and the recording-surface are obtained by the use of two points giving a duplex or divided record, the advantage of leverage between the diaphragm and the recording-point would be considerable with a single point giving a single or undivided record.

I do not herein claim the combination, in a phonograph, of a diaphragm, a point, and a lever intervening between the diaphragm and the point.

What I claim as my invention is—

1. The combination, with the diaphragm of a phonograph, of two points connected with said diaphragm, and one or more moving surfaces adapted to be acted upon by or to act upon said points, substantially as herein described, whereby a duplex or divided record of the sound-vibrations is obtained or employed, substantially as herein set forth.

2. The combination, with the diaphragm of a phonograph, of two recording-surfaces, or surfaces having marks thereon corresponding with sound-vibrations, a lever connected with the diaphragm and having attached to it two points adapted one to operate upon or be operated upon by one of said surfaces, and the other to operate upon or be operated upon by the other of said surfaces, for the purpose of obtaining or employing a duplex or divided record, substantially as herein described.

3. The combination, with the diaphragm of a phonograph, of two cylinders adapted to carry yielding recording-surfaces, or surfaces having marks thereon corresponding with sound-vibrations, and a lever connected with said diaphragm and carrying two points, one of which is arranged to operate upon or be operated upon by the surface on one of said cylinders, and the other of which is arranged to operate upon or be operated upon by the surface on the other of said cylinders, substantially as and for the purpose herein set forth.

4. The combination, with the diaphragm of a phonograph, of two tubes and mouth-pieces, one on each side of the diaphragm, substantially as and for the purpose herein specified.

5. The combination, with the diaphragm of a phonograph and two mouth-pieces, one on each side thereof, of a cap adapted to fit and close either of said mouth-pieces, substantially as and for the purpose herein described.

6. The combination, with the diaphragm of a phonograph, of a mouth-piece communicating directly with one side of the diaphragm, and a bent tube communicating with the other side of the diaphragm and furnished with a mouth-piece presenting its opening in the same direction as the said directly-communicating mouth-piece, substantially as and for the purpose herein specified.

A. WILFORD HALL.

Witnesses:
FRED. HAYNES,
T. J. KEANE.